United States Patent [19]
Koike

[11] Patent Number: 5,416,619
[45] Date of Patent: May 16, 1995

[54] LIQUID CRYSTAL DISPLAY DEVICE WITH REVERSE TILT SUPPRESSING MEANS

[75] Inventor: Satofumi Koike, Kanagawa, Japan

[73] Assignee: Sony Corporation, Tokyo, Japan

[21] Appl. No.: 992,012

[22] Filed: Dec. 17, 1992

[30] Foreign Application Priority Data

Dec. 17, 1991 [JP] Japan .................................. 3-353819

[51] Int. Cl.⁶ .................. G02F 1/1343; G02F 1/1337
[52] U.S. Cl. ......................................... 359/57; 359/54;
 359/59; 359/76
[58] Field of Search ................ 359/59, 57, 76, 75, 359/54

[56] References Cited

U.S. PATENT DOCUMENTS

| | | | |
|---|---|---|---|
| 3,772,874 | 11/1973 | Lefkowitz | 58/50 R |
| 4,405,208 | 9/1983 | Shirai | 359/75 |
| 4,878,742 | 11/1989 | Ohkubo et al. | 359/77 |
| 5,198,917 | 3/1993 | Togashi | 359/75 |
| 5,307,189 | 4/1994 | Nishiki et al. | 359/59 |

FOREIGN PATENT DOCUMENTS 2162621  7/1973  France .

OTHER PUBLICATIONS

Abstract of JP 52299944 of Dec. 26, 1987, *Patent Abstracts of Japan*, vol. 12, No. 194 (P713), 7 Jun. 1988.
Abstract of JP 3177817 of Aug. 1, 1991, *Patent Abstracts of Japan*, vol. 15, No. 430 (P1270), 31 Oct. 1991.
Abstract of JP 3111820 of May 13, 1991, *Patent Abstracts of Japan*, vol. 15, No. 312 (P1236), 9 Aug. 1991.
Abstract of JP 4051121 of Feb. 19, 1992, *Patent Abstracts of Japan*, 16, No. 237, (P1362), 29 May 1992.

*Primary Examiner*—Anita Pellman Gross
*Attorney, Agent, or Firm*—Hill, Steadman & Simpson

[57] ABSTRACT

A liquid crystal display device comprises: a first substrate; picture element electrodes formed on the inner surface of the first substrate and arranged in a matrix; switching elements formed on the inner surface of the first substrate and combined respectively with the picture element electrodes; address lines formed on the inner surface of the first substrate so as to extend respectively along the rows of the picture element electrodes; signal lines formed on the inner surface of the first substrate so as to extend respectively along the columns of the picture element electrodes; a second substrate disposed opposite to the first substrate so that a space of a predetermined thickness is formed between the first and second substrates; a common electrode formed over the inner surface of the second substrate; a liquid crystal layer sealed in the space; and an orienting layer formed at least between the inner surface of either the first substrate or the second substrate and the liquid crystal layer. The liquid crystal display device is provided with a reverse tilt suppressing means for suppressing the reverse tilt of a portion of the liquid crystal layer corresponding to the edge portion of each picture element electrode.

14 Claims, 8 Drawing Sheets

F I G. I
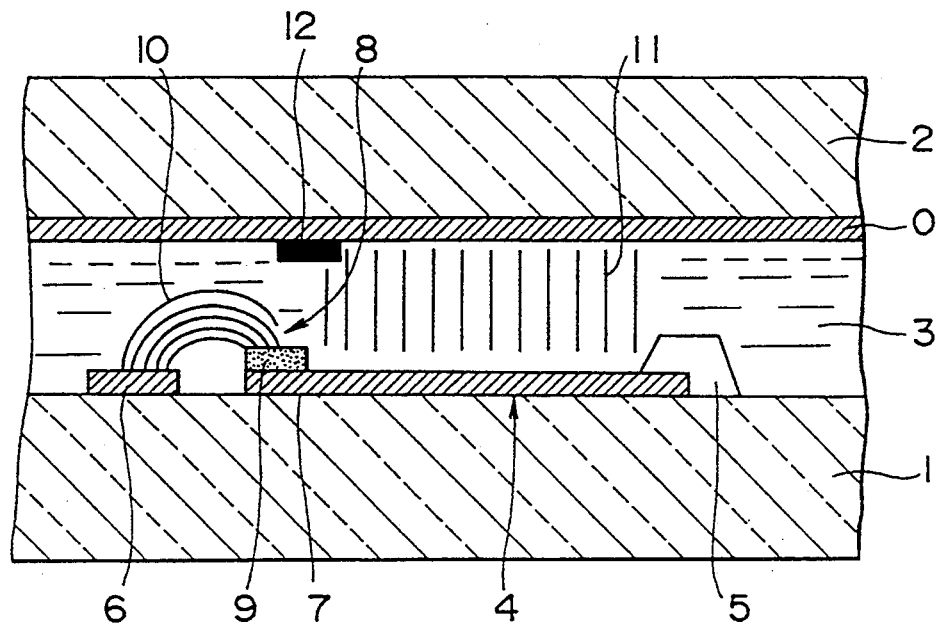
F I G. 2
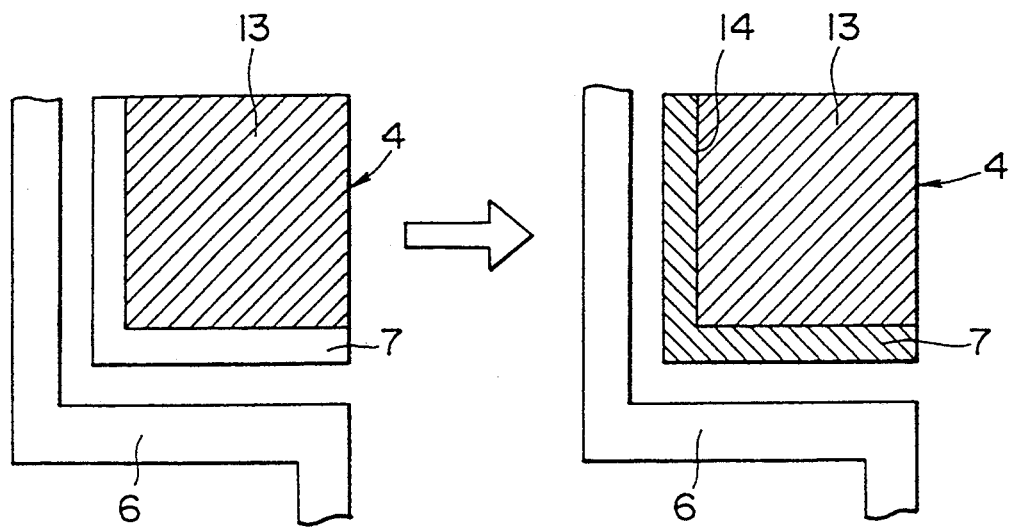

LIGHT

LIQUID CRYSTAL DISPLAY DEVICE WITH REVERSE TILT SUPPRESSING MEANS

BACKGROUND OF THE INVENTION

1. Field of the Invention

The present invention relates to a liquid crystal display device of an active matrix type provided with a matrix of picture element electrodes and switching devices and, more specifically, to a liquid crystal display device of an active matrix type incorporating a structure capable of suppressing the inverse orientation of the liquid crystal molecules or reverse tilt that occurs along the edges of the picture element electrodes.

2. Description of the Related Art

The construction of a general liquid crystal display device of an active matrix type will be described with reference to FIG. 13 to facilitate understanding the present invention.

A transmissive type liquid crystal display device comprises two polarizers 110 and 111, and a liquid crystal panel sandwiched between a pair of the polarizer 110 and 111, and comprises a first glass substrate 101, a second glass substrate 102 disposed opposite to the first glass substrate 101, and a liquid crystal 103 sealed in the space between the two glass substrates 101 and 102. Formed on the inner surface of the first glass substrate 101 are signal lines 104, address lines 105 extending in a direction perpendicular to the signal lines 104, thin film transistors (TFTs) 106, i.e., switching devices, which are arranged in a matrix in areas demarcated by the signal lines 104 and the address lines 105, and picture element electrodes 107, which are arranged in a matrix in the areas demarcated by the signal lines 104 and the address lines 105. Formed on the inner surface of the second glass substrate 102 are a common electrode 108, and R, G and B color filters 109.

When driving the liquid crystal display panel, selection signals having a pulse width corresponding to a horizontal scanning period are applied sequentially to the address lines 105. In a period where one of the address lines 105 is selected, sampled image signals are held on the signal lines 104, and then, image signals are written in the corresponding picture element electrodes 107. The image signal written in each picture element electrode 107 is held for a period corresponding to one field, and then a signal of the opposite polarity is written in the picture element electrode 107 for the next field. Thus, the liquid crystal 103 is driven by alternate signals.

Electric fields created between the signal lines 104 and the picture element electrodes 107 and between the address lines 105 and the picture element electrodes 107 disturb the molecular orientation of the liquid crystal. Such irregular molecular orientation of the liquid crystal is called reverse tilt. Referring to FIG. 14, the signal line 104 or the address line 105, and the picture element electrode 107 are formed on the first glass substrate 101, and the surface of the first glass substrate 101 is coated with a alignment layer 112. A lateral electric field substantially parallel to the surface of the first glass substrate 101 is created between the signal line 104 (the address line 105) and the picture element electrode 107 and the orientation of the molecules 113 of the liquid crystal is changed forcibly by the electric field. Consequently, strain is induced therein and elastic energy is concentrated. Since it is possible that the interaction of the molecules 113 of the liquid crystal induces strain energy in the picture element electrode 107, an abnormal domain 114 of an orientation different from that of most part of the picture element electrode 107 is formed in the picture element electrode 107 as shown in FIG. 15. Such a phenomenon is called reverse tilt.

As shown in FIG. 15, the abnormal domain 114 is formed by reverse tilt along the edges of the picture element electrode 107 extending along the signal line 104 (or the address line 105). A disclination occurs along the boundary between the abnormal domain 114 and the normal domain 115 and an emission line appears along the disclination line. If a picture element is displayed in black against the white background, the contrast ratio of the device is reduced because the emission line increases the transmissivity of the black picture element. Various reverse tilt suppressing means have been proposed, none of which, however, has practically been effective.

For example, a reverse tilt suppressing means disclosed in Japanese Patent Laid-open (Kokai) No. Hei 1-266512 removes beforehand a region of a picture element electrode in which reverse tilt is liable to occur or covers a region of a picture element electrode in which reverse tilt is liable to occur with a black mask. Such a reverse tilt suppressing means, however, reduces the aperture ratio of the device because the effective area of the picture element electrode is reduced.

SUMMARY OF THE INVENTION

Accordingly, it is an object of the present invention to provide a liquid crystal display device capable of effectively suppressing reverse tilt without reducing the aperture ratio.

The liquid crystal display device of an active matrix type is used widely as a display screen for personal computers, word processors, television sets and viewfinders. Since the miniaturized liquid crystal display device has minute picture elements and the bus lines and the picture element electrodes are arranged closely, the adverse effect of reverse tilt is significant. Reverse tilt causes disclination lines to appear to reduce the contrast of the picture elements to the background. Capable of suppressing reverse tilt without sacrificing the aperture ratio, the present invention is effectively applicable particularly to a miniaturized high-definition liquid crystal display device having minute picture elements.

A liquid crystal display device in a first aspect of the present invention comprises; a first substrate; a plurality of picture elements arranged in a matrix on the inner surface of the first substrate with each element comprising a picture element electrode and a switching element associated with the picture element electrode; bus lines located adjacent to each picture element electrode, said bus lines comprising address lines associated with the rows of the picture element electrodes and signal lines associated with the columns of the picture element electrodes; a second substrate spaced apart from the first substrate and having an electrode on the inner surface thereof; a liquid crystal layer sealed between the first and second substrates; and reverse tilt suppressing means for suppressing the reverse tilt of a portion of the liquid crystal layer corresponding to the edge portion of the picture element electrode.

A liquid crystal display device in a second aspect of the present invention comprises; a second insulating substrate disposed opposite to and in parallel to the first insulating substrate so as to form a space of a predetermined thickness between the first and second insulating substrates; a liquid crystal layer sealed between the first and second insulating substrates; a plurality of parallel address lines formed on the inner surface of the first insulating substrate; a plurality of parallel signal lines formed on the inner surface of the first insulating substrate so as to intersect the address lines perpendicularly; a plurality of switching elements connected respectively to the intersections of the address lines and the signal lines; a plurality of picture element electrodes electrically connected respectively to the switching elements; and a reverse tilt suppressing means for suppressing the reverse tilt of the liquid crystal layer.

The first reverse tilt suppressing means comprises the control portion for making the electric field applied to a portion of the liquid crystal layer extending along the edge of the picture element electrode different from the electric field applied to a portion of the liquid crystal layer extending over the central portion of the picture element electrode. The control portion cancels the effect of a lateral electric field that causes reverse tilt to suppress reverse tilt or to limit a region in which reverse tilt occurs.

The second reverse tilt suppressing means makes the orientation of a portion of the liquid crystal between the signal line or the address line and the picture element electrode different from that of a portion of the liquid crystal layer extending over the picture element electrode. Since reverse tilt is difficult to occur in the portion of the liquid crystal layer between the signal line or the address line, reverse tilt can be suppressed and the interior of the picture element electrode is not effected by reverse tilt.

The third reverse tilt suppressing means comprises the dummy electrode of the same potential as that of the picture element electrode, formed in a region between the signal line or the address line and the picture element electrode on the substrate. The dummy electrode absorbs a lateral electric field that causes reverse tilt to suppress or prevent reverse tilt.

BRIEF DESCRIPTION OF THE DRAWINGS

The above and other objects, features and advantages of the present invention will become more apparent from the following description taken in connection with the accompanying drawings, in which:

FIG. 1 is a fragmentary, schematic sectional view of a liquid crystal display device in a first embodiment according to the present invention;

FIG. 2 is a typical view of assistance in explaining the operation of the liquid crystal display device of FIG. 1;

DETAILED DESCRIPTION OF THE PREFERRED EMBODIMENTS

First Embodiment

Figure 3:
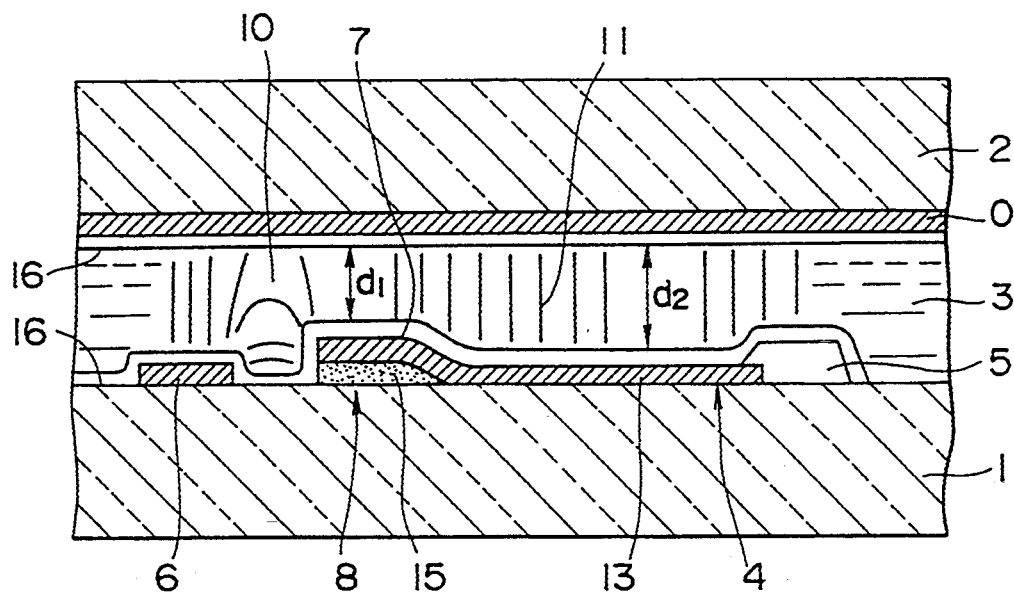
FIG. 3 is a fragmentary, schematic sectional view of a liquid crystal display device in a second embodiment according to the present invention.

Referring to FIG. 1 showing a liquid crystal display device of an active matrix type in a fragmentary, schematic sectional view, the liquid crystal display device comprises a first transparent substrate 1, a second transparent substrate 2 disposed opposite to the first transparent substrate so as to form a space of a predetermined thickness between the first transparent substrate 1 and the second transparent substrate 2, and a liquid crystal layer 3 sealed in the space between the first transparent substrate 1 and the second transparent substrate 2. A plurality of transparent picture element electrodes 4 are arranged in a matrix on the inner surface of the first transparent substrate 1. A plurality of insulated gate field effect thin film transistors (TFTs) 5, i.e., switching elements, respectively for operating the picture element electrodes 4 are combined respectively with the picture element electrodes 4. Address lines respectively for selecting rows of the TFTs 5 are formed respectively along rows of the picture element electrodes 4, and signal lines for sending image signals to the selected TFTs 5 are extended respectively along the columns of the picture element electrodes 4. In FIG. 1, the address line and the signal line are represented by a bus line 6 to simplify the drawing. A transparent common electrode O is formed over the inner surface of the second transparent substrate 2. The picture element and common electrodes are formed from indium tin oxide (ITO) or the like. An orientating layer, not shown, is formed at least between the inner surface of either the first transparent substrate 1 or the second transparent substrate 2 and the liquid crystal layer 3.

A control portion 8 for changing the electric field applied to the liquid crystal layer 3 is formed along the edge portion 7 of the picture element electrode 4 contiguous with the bus line 6 to suppress reverse tilt that occurs in the liquid crystal layer 3. In this embodiment, the control portion 8 has a capacitance element 9 formed along the edge portion 7. The capacitance element 9 is formed by etching, for example, a transparent silicon dioxide thin film formed over the entire inner surface of the first transparent substrate 1 by sputtering or vacuum evaporation by a photolithographic etching process. A transparent acrylic thin film may be used instead of the silicon dioxide thin film. When forming the capacitance element 9 of a transparent acrylic resin, an ultraviolet-setting acrylic resin is applied to the inner surface of the first transparent substrate 1 in a uniform, transparent acrylic resin thin film, and then the transparent acrylic resin thin film is patterned by a photographic process. Reverse tilt caused by a lateral electric field 10 is suppressed for a time in which the capacitance element 9 is saturated, so that the occurrence of reverse tilt can be delayed. A rapid, longitudinal electric field 11 is applied across the most part of the picture element electrode 4 and the common electrode O. A black mask 12 is formed on the inner surface of the second transparent substrate 2 in an area corresponding to the inner side of the capacitance element 9 to screen a disclination line. The black mask 12 may be formed on the inner surface of the first transparent substrate 1.

The operation of the liquid crystal display device will be described with reference to FIG. 2. The bus line 6, i.e., the address line or the signal line, is extended along the edge portion 7 of the substantially square picture element electrode 4. Since a voltage is applied continuously to the signal line, it is highly possible that the signal line causes reverse tilt. Although a voltage is applied intermittently to the address line, it is also possible that the address line causes reverse tilt. The present invention is capable of dealing with reverse tilt caused by either the address line or the signal line. When the picture element electrode 4 is selected, a voltage is applied to the selected picture element electrode 4. Then, a portion of the liquid crystal layer 3 corresponding to the major portion 13 of the picture element electrode 4, namely, a portion of the picture element electrode 4 excluding the edge portion 7, responds to the voltage and starts darkening. This portion of the liquid crystal layer 4 is in the state of normal tilt. The response of a portion of the liquid crystal layer 3 corresponding to the edge portion 7 of the picture element electrode 4 is delayed by the capacitance element 9 by a time in which the capacitance element 9 is saturated, and the portion of the liquid crystal layer 3 corresponding to the edge portion 7 starts darkening after the capacitance element 9 has been saturated. It is possible that reverse tilt occurs in this portion of the liquid crystal layer 3 corresponding to the edge portion 7 due to the effect of the lateral electric field. If reverse tilt occurs in this portion of the liquid crystal layer 3, a disclination line 14 appears along the boundary between the edge portion 7 and the major portion 13. Since the disclination line 14 is screened by the black mask 12, the contrast of the picture element to the background is not reduced. Since the portion of the liquid crystal layer 3 corresponding to the major portion 13 turns the state of normal tilt first, and then the portion of the liquid crystal layer 3 corresponding to the edge portion 7 turns the state of reverse tilt, the expansion of the portion of the liquid crystal layer 3 in the state of reverse tilt is suppressed by the portion of the liquid crystal layer 3 which has turned the the state of normal tilt before the latter portion of the liquid crystal layer 3 turns the state of reverse tilt.

Second Embodiment

A liquid crystal display device in a second embodiment according to the present invention is shown in FIG. 3, in which parts like or corresponding to those of the first embodiment are denoted by the same reference characters.

Referring to FIG. 3, the liquid crystal display device comprises a first transparent substrate 1, a second transparent substrate 2 disposed opposite to the first transparent substrate 2 so as to form a space of a predetermined thickness between the first transparent substrate 1 and the second transparent substrate 2, and a liquid crystal layer seal in the space between the first transparent substrate 1 and the second transparent substrate 2. A plurality of transparent picture element electrodes 4 are formed in a matrix on the inner surface of the first transparent substrate 1, and a plurality of TFTs 5 for operating the picture element electrodes 4 are combined, respectively, with the picture element electrodes 4. Address lines are formed respectively along the rows of the picture element electrodes 4, and signal lines are formed respectively along the columns of the picture element electrodes 4. A common electrode O is formed over the inner surface of the second transparent substrate 2. Orientation layers 16 are formed respectively over the respective inner surfaces of the first transparent substrate 1 and the second transparent substrate 2. A control part 8 for changing an electric field applied to the liquid crystal layer 3 has a step 15 formed under the edge portion 7 of the picture element electrode 4. The step 15 is formed by patterning, for example, a silicon dioxide thin film. Since the edge portion 7 of the picture element electrode 4 is raised by the step 15, the thickness d1 of a portion of the liquid crystal layer 3 corresponding to the edge portion 7 of the picture element electrode 4 is smaller than the thickness d2 of a portion of the liquid crystal layer 3 corresponding to the major portion 13 of the picture element electrode 4.

Figure 4:
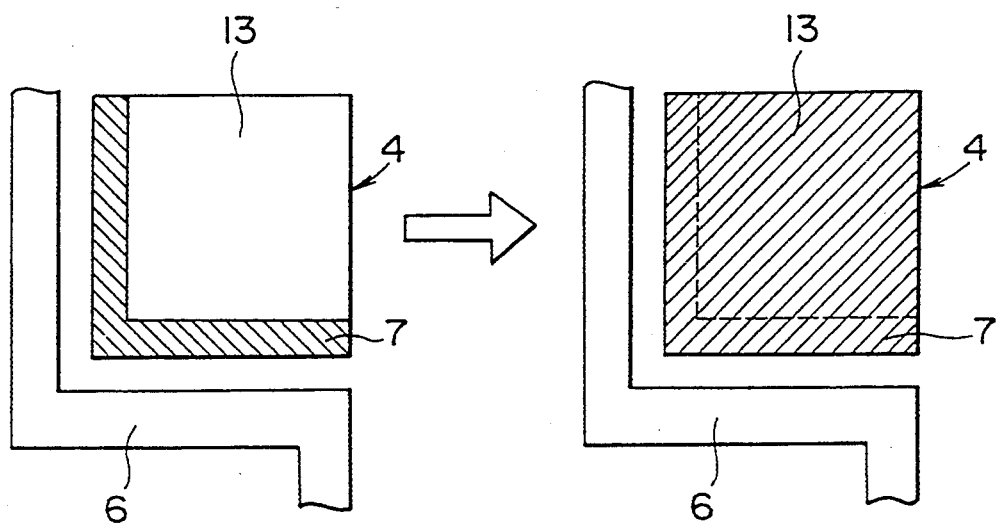
FIG. 4 is a typical view of assistance in explaining the operation of the liquid crystal display device of FIG. 3.

The operation of the liquid crystal display device in the second embodiment will be described with reference to FIG. 4. When the picture element electrode 4 is selected and a voltage is applied thereto, a portion of the liquid crystal layer 3 corresponding to the edge portion 7 starts darkening first because the thickness d1 of the portion is smaller than the thickness d2 of a portion of the same corresponding to the major portion of the picture element electrode 4. The portion of the liquid crystal layer 3 corresponding to the edge portion 7 is in the state of normal tilt because the thickness d1 of the portion of the liquid crystal layer 3 corresponding to the edge portion 7 is relatively small and hence the intensity of a longitudinal electric field 11 applied to the same portion of the liquid crystal layer 3 is high enough to cancel a lateral electric field 10 that causes reverse tilt. Subsequently, a portion of the liquid crystal layer 3 corresponding to the major portion 13 of the picture element electrode 4 and being in the state of normal tilt responds to the voltage and starts darkening. Since both the portion corresponding to the edge portion 7 of the picture element electrode 4 and the portion corresponding to the major portion 13 of the same are in the state of normal tilt, no disclination line appears. Accordingly, the liquid crystal display device need not be provided with any black mask and hence the picture element electrode has a large aperture ratio.

Third Embodiment

Figure 5:
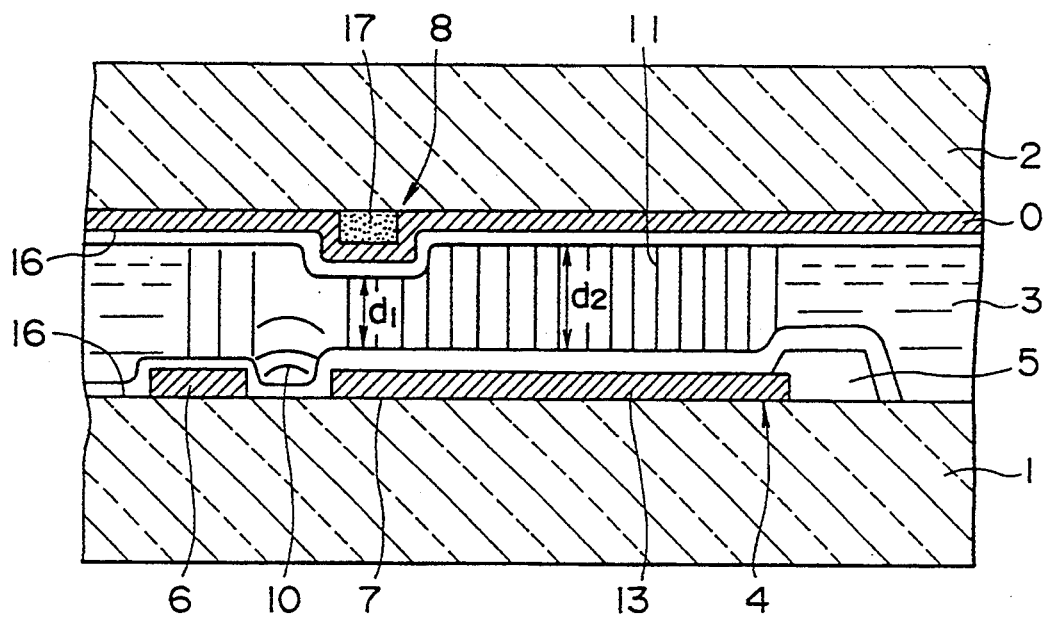
FIG. 5 is a fragmentary, schematic sectional view of a liquid crystal display device in a third embodiment according to the present invention.

A liquid crystal display device in a third embodiment according to the present invention will be described hereinafter with reference to FIG. 5, in which parts like or corresponding to those of the liquid crystal display device in the second embodiment are denoted by the same reference characters and the description thereof will be omitted.

The liquid crystal display device in the third embodiment is different from that in the second embodiment in that the former liquid crystal display device is provided with a step 17 formed on the inner surface of the second transparent substrate 2 at a position corresponding to the edge portion 7 of the picture element electrode 4 formed on the inner surface of the first transparent substrate 1 and covered with the common electrode O. Accordingly, the thickness d1 of a portion of the liquid crystal layer 3 corresponding to the edge portion 7 of the picture element electrode 4 is smaller than the thickness d2 of a portion of the same corresponding to the major portion 13 of the picture element electrode 4. The step 17 is formed by patterning a film of an ultraviolet-setting acrylic resin. The material forming the step 17 need not necessarily be limited to the ultraviolet-setting acrylic resin or silicon dioxide; the step may be formed of any material capable of forming a transparent film and of being readily patterned.

Fourth Embodiment

Figure 6:
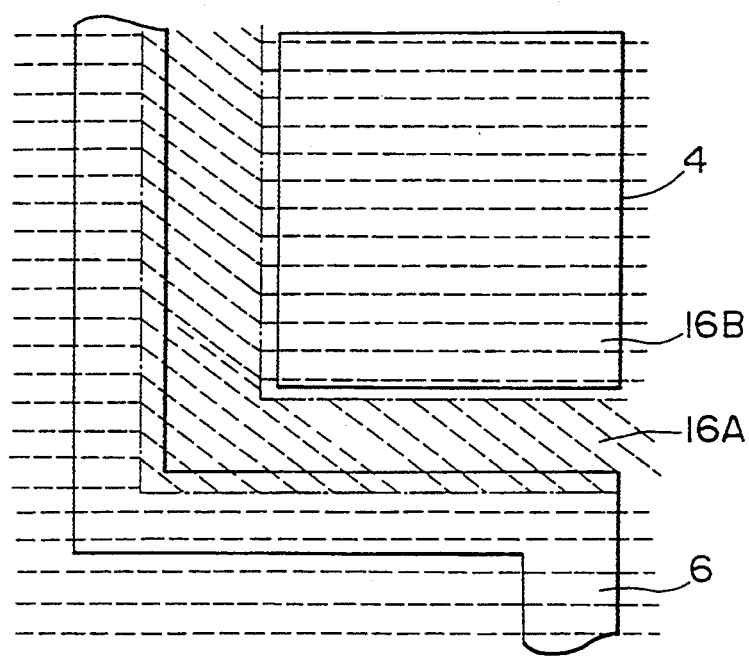
FIG. 6 is a fragmentary, schematic plan view of a liquid crystal display device in a fourth embodiment according to the present invention.
Figure 7:
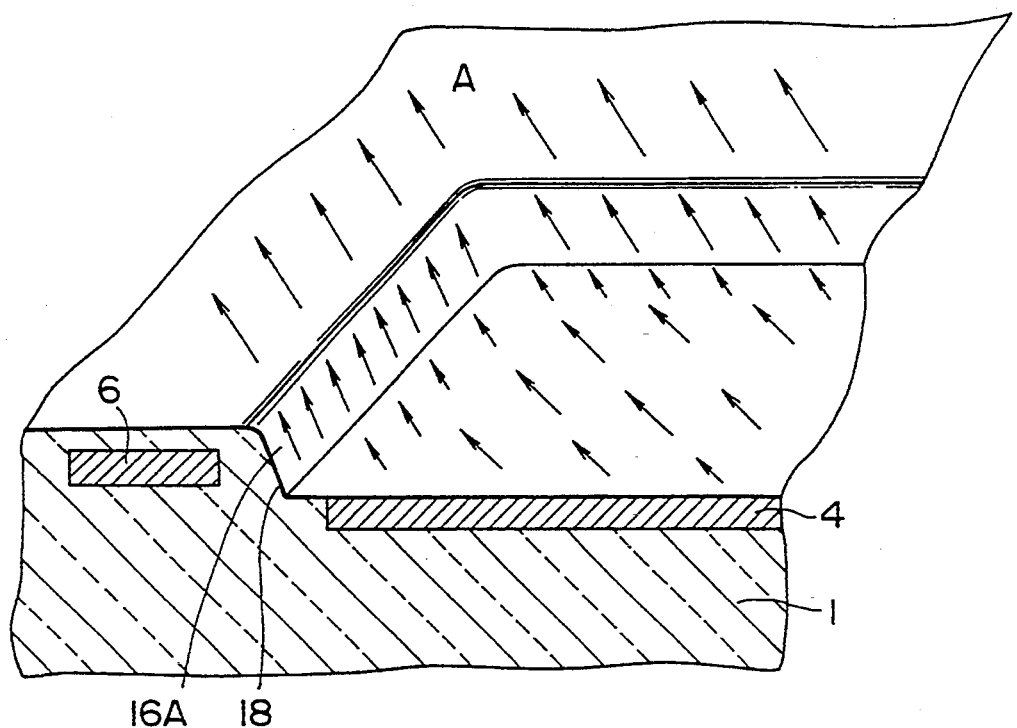
FIG. 7 is a typical view of assistance in explaining a first rubbing treatment employed in fabricating the liquid crystal display device of FIG. 6.

A liquid crystal display device in a fourth embodiment according to the present invention will be described hereinafter with reference to FIG. 6. As shown in FIG. 6, the liquid crystal display device is provided with an orientating layer having an orientating region 16A for making the orientation of a portion of a liquid crystal layer extending between at least a portion of a bus line 6 and a picture element electrode 4 different from that of an orientating region 16B of the liquid crystal layer corresponding to the picture element electrode 4 to suppress reverse tilt. The orientation or the direction of rubbing of the orientating region 16A corresponding to a region between the bus line 6 and the picture element electrode 4 is different from that of the orientating region 16B corresponding to the picture element electrode 4. The orientating region 16A is orientated so as to prevent or suppress reverse tilt effectively. Accordingly, reverse tilt can be suppressed even if the orientating region 16B corresponding to a portion including a portion corresponding to the edge portion of the picture element electrode 4 is orientated normally.

Figure 8:
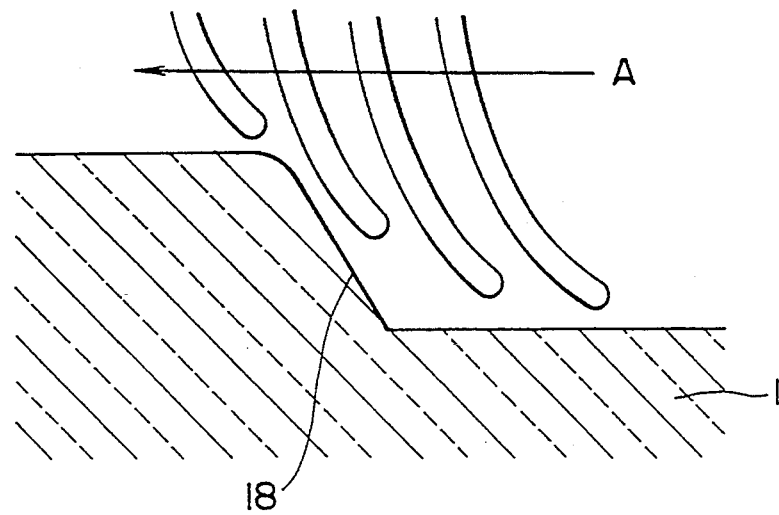
FIG. 8 is a typical view of assistance in explaining the rubbing treatment.

A method of forming the orientating region 16A will be described hereinafter with reference to FIGS. 7 to 10. A slope 18 formed between a picture element electrode 4 and a signal line 6 formed by patterning an aluminum film or the like is used for forming the orientating region 16A. First, an orientating film of polyimide resin or the like is formed over the surface of a substrate 1, and then the orientating film is rubbed with cotton cloth for the first rubbing treatment in a rubbing direction indicated by the arrow A selectively determined so as to suppress reverse tilt effectively. As shown in FIG. 8, the slope 18 is rubbed in the direction of the arrow A with the cotton cloth or the like as well as the flat surface of the substrate 1, so that the orientating region 16A for suppressing reverse tilt is formed on the slope 18.

Figure 9:
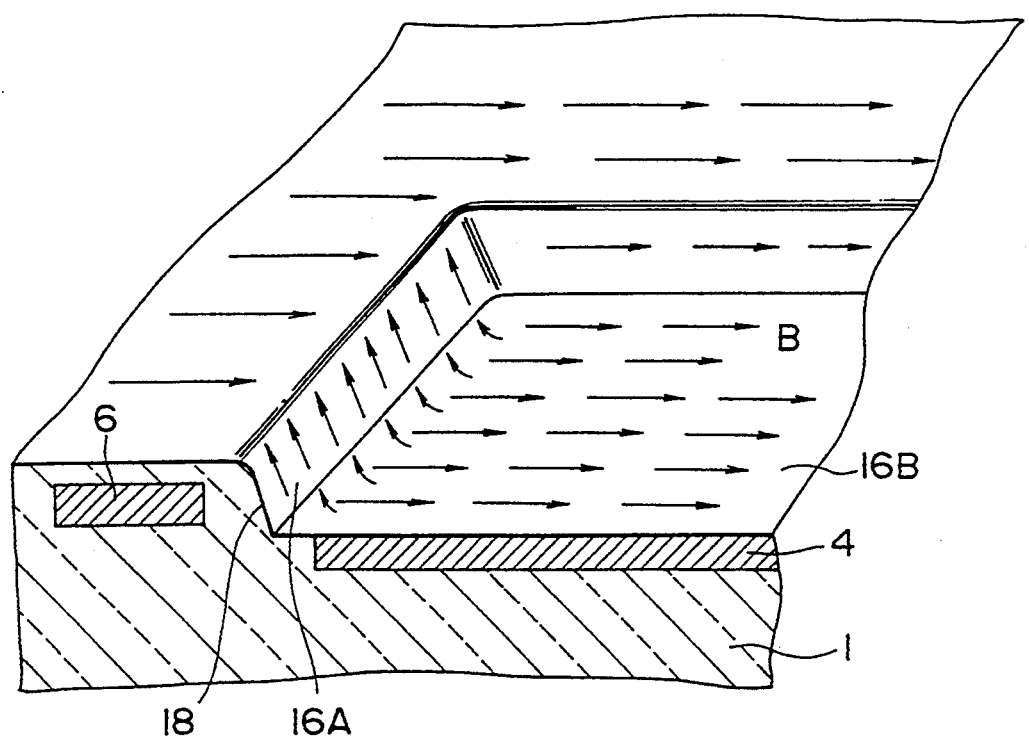
FIG. 9 is a typical view of assistance in explaining a second rubbing treatment employed in fabricating the liquid crystal display device of FIG. 6.
Figure 10:
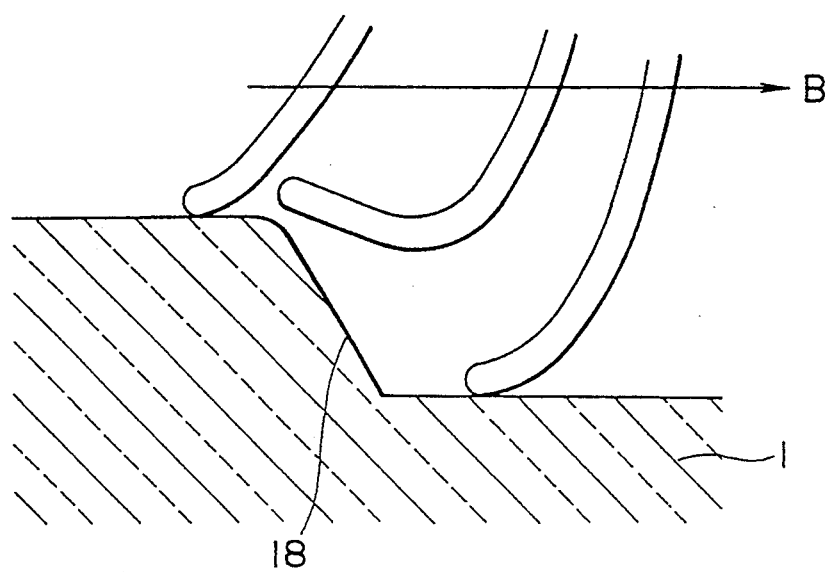
FIG. 10 is a typical view of assistance in explaining the second rubbing treatment.

Then, as shown in FIG. 9, the orientating layer is rubbed with the cotton cloth for the second rubbing treatment in a rubbing direction indicated by the arrow B to form the orientating region 16B over the surface of the picture element electrode 4. As shown in FIG. 10, the cotton cloth is moved in the direction of the arrow B so as to move down the slop 18. Therefore, the cotton cloth is unable to rub the slope 18 and hence the orientating region 16A formed on the slope 18 remains unchanged. On the other hand, the portion of the orientating layer corresponding to the flat portion of the substrate 1 is rubbed with the cotton cloth, so that the orientating region 16B is formed. The orientating regions 16A and 16B can satisfactorily be formed when the angle between the rubbing direction indicated by the arrow A for the first rubbing treatment and the rubbing direction indicated by the arrow B for the second rubbing treatment is, for example, 135°.

The orientating regions 16A and 16B may be formed by a method other than the foregoing method using the slope 18 formed on the surface of the substrate 1 and the rubbing treatments; for example, the orientating regions 16A and 16B may be formed by a process of patterning an orientating film or a process of changing the tilt by irradiation with ultraviolet rays.

Fifth Embodiment

Figure 11:
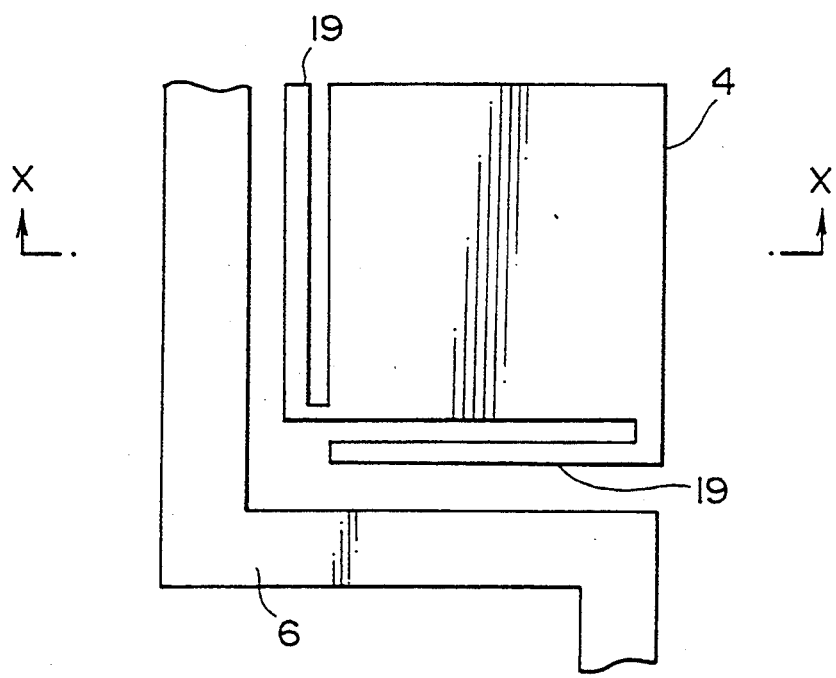
FIG. 11 is a fragmentary, schematic view of a liquid crystal display device in a fifth embodiment according to the present invention.

A liquid crystal display device in a fifth embodiment according to the present invention will be describe hereinafter with reference to FIGS. 11 and 12. As shown in FIG. 11, dummy electrodes 19 are formed in areas on the surface of a substrate between a picture element electrode 4 and at least portions of a bus line 6. The potential of the dummy electrodes 19 is equal to that of the picture element electrode 4. The picture element electrode 4 and the dummy electrodes 19 may simultaneously be formed by patterning a conductive film.

Figure 12:
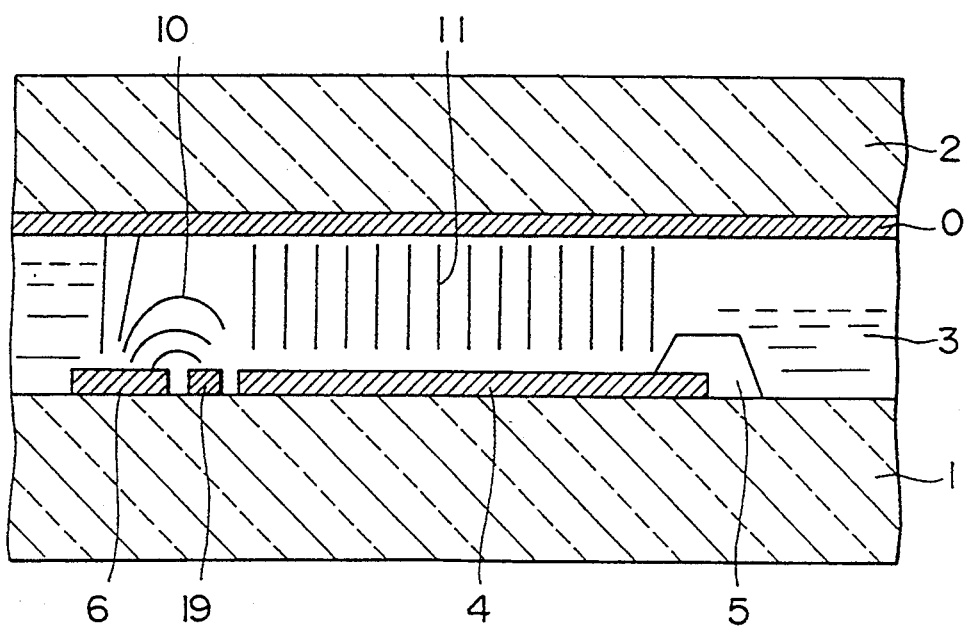
FIG. 12 is a typical view of assistance in explaining the operation of the liquid crystal display device of FIG. 11.
Figure 13:
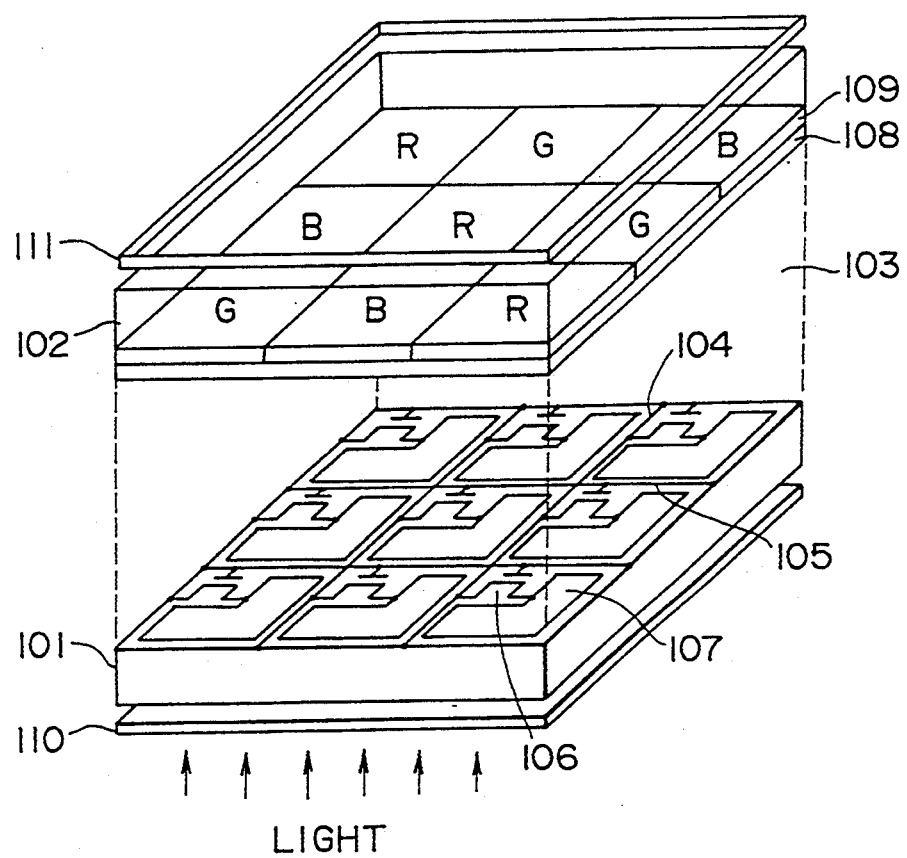
FIG. 13 is an exploded perspective view of a general liquid crystal display device of an active matrix type.
Figure 14:
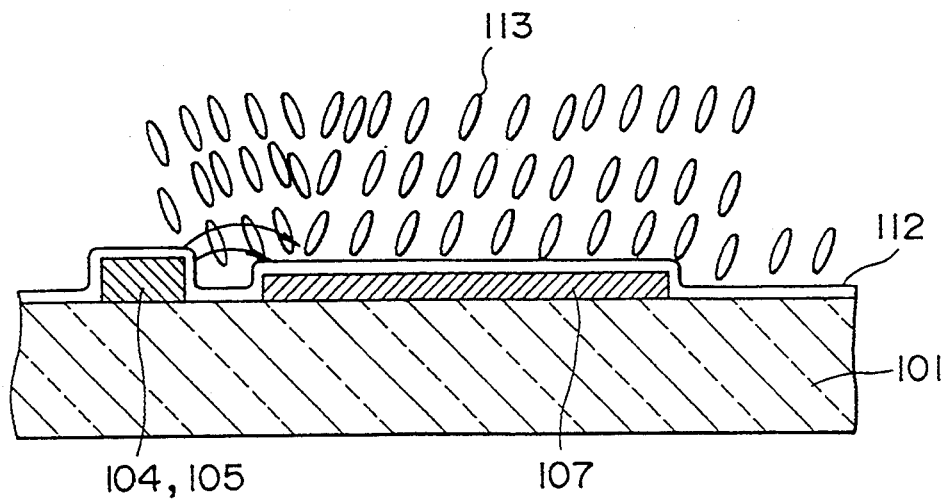
FIG. 14 is a pictorial view of assistance in explaining reverse tilt.
Figure 15:
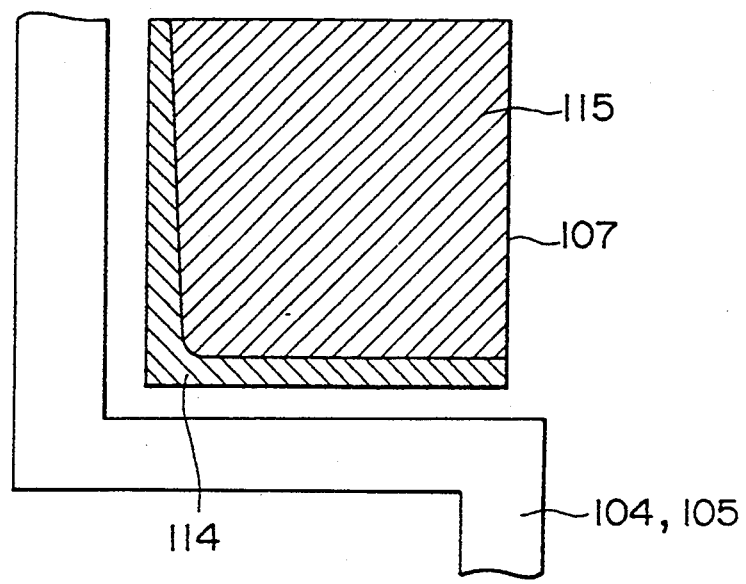
FIG. 15 is a view of assistance in explaining the effect of reverse tilt on a picture element electrode.

FIG. 12 is a fragmentary sectional view of the liquid crystal display device taken on the line X—X in FIG. 11. The dummy electrodes 19 are formed between the bus line 6 and the edge portions of the picture element electrode 4. The dummy electrodes 19 absorbs a lateral electric field 10 that causes reverse tilt and, consequently, the edge portions of the picture element electrode 4 are not effected by the lateral electric field 10. Even if reverse tilt occurs in a portion of the liquid crystal layer between the dummy electrode 19 and the bus line 6, the state of reverse tilt never expands to the edge portion of the picture element electrode 4. If the bus line 6 is a signal line, the potential of the dummy electrodes 19 may be equal to that of the signal line.

As is apparent from the foregoing description, the first means according to the present invention comprises the control portion for changing the electric field applied to the liquid crystal layer, formed in the edge portion of the picture element electrode extending along the adjacent bus line to suppress reverse tilt. The second means according to the present invention makes the orientation of a portion of the liquid crystal layer corresponding to a region between the picture element electrode and at least a portion of the bus line different from that of a portion of the liquid crystal layer corresponding to the picture element electrode. The third means according to the present invention employs the dummy electrode of the same potential as that of the picture element electrode, formed in an area on the surface of the substrate between the picture element electrode and at least a portion of the bus line to suppress reverse tilt. Thus, any one of these means according to the present invention is capable of effectively preventing or suppressing reverse tilt without sacrificing the aperture ratio of the device.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A liquid crystal display device comprising:
a first substrate;
a plurality of picture elements arranged in a matrix on the inner surface of the first substrate, each element comprising a picture element electrode and a switching element associated with the picture element electrode;
bus lines located adjacent to each picture element electrode, said bus lines comprising address lines associated with the rows of the picture element electrodes and signal lines associated with the columns of the picture element electrodes;
a second substrate spaced apart from the first substrate and having an electrode on the inner surface thereof;
a liquid crystal layer sealed between the first and second substrates; and
reverse tilt suppressing means for suppressing the reverse tilt of a portion of the liquid crystal layer corresponding to the edge portion of each picture element electrode, said suppressing means including means for controlling an electric field applied to the liquid crystal layer comprising a step portion so that for each picture element the thickness of the liquid crystal layer corresponding to an edge of the corresponding picture element electrode is smaller than that of the liquid crystal layer corresponding to the picture element electrode away from the edge.

2. A liquid crystal display device as claimed in claim 1, wherein said step portion is provided adjacent to the signal lines.

3. A liquid crystal display device as claimed in claim 1, wherein said step portion is provided adjacent to the address lines.

4. A liquid crystal display device as claimed in claim 1, wherein said step portion is formed under an edge portion of each picture element electrode.

5. A liquid crystal display device as claimed in claim 1, wherein said step portion is provided at a position on the inner surface of the second substrate corresponding to the edge of each picture element electrode.

6. A liquid crystal display device according to claim 1, further comprising an alignment layer formed in contact with the liquid crystal layer.

7. A liquid crystal display device comprising:
a first insulating substrate;
a second insulating substrate disposed opposite to and in parallel to the first insulating substrate so as to form a space of a predetermined thickness between the first and second insulating substrates;
a liquid crystal layer sealed between the first and second insulating substrates;
a plurality of parallel address lines formed on the inner surface of the first insulating substrate;
a plurality of parallel signal lines formed on the inner surface of the first insulating substrate so as to intersect the address lines perpendicularly;
a plurality of switching elements connected respectively to the intersections of the address lines and the signal lines;
a plurality of picture element electrodes electrically connected respectively to the switching elements; and
control means for suppressing the reverse tilt of the liquid crystal layer by controlling an electric field applied to a portion of the liquid crystal layer corresponding to the edge portion or the edge portions of each of the picture element electrodes so that the portion of the liquid crystal layer is not subjected to the influences of a lateral electric field.

8. A liquid crystal display device according to claim 7, wherein said switching elements comprise thin film transistors.

9. A liquid crystal display device according to claim 7, wherein said control means comprises a capacitance element.

10. A liquid crystal display device according to claim 7, wherein said control means comprises a step formed under an edge portion of each picture element electrode.

11. A liquid crystal display device as claimed in claim 7, wherein said control means has a molecular alignment region of the liquid crystal layer corresponding to a region between each picture element electrode and at least a portion of the signal line or address line adjacent to the corresponding picture element electrode, said molecular alignment region having a direction different from a portion of the liquid crystal layer corresponding to each picture element electrode.

12. A liquid crystal display device as claimed in claim 7, wherein said control means comprises a dummy electrode formed on the inner surface of the first insulating substrate, said dummy electrode being the same potential as that of the picture element electrode or of the signal line.

13. A liquid crystal display device comprising:
a first substrate;
a plurality of picture elements arranged in a matrix on the inner surface of the first substrate each element comprising a picture element electrode and a switching element associated with the picture element electrode;
bus lines located adjacent to each picture element electrode, said bus lines comprising address lines associated with the rows of the picture element electrodes and signal lines associated with the columns of the picture element electrodes;
a second substrate spaced apart from the first substrate and having an electrode on the inner surface thereof;
a liquid crystal layer sealed between the first and second substrates; and
reverse tilt suppressing means for suppressing the reverse tilt of a portion of the liquid crystal layer corresponding to the edge portion of each picture element electrode, said reverse tilt suppressing means comprising a dummy electrode formed between the corresponding picture element electrode and at least a portion of the bus lines on the inner surface of the first substrate and being electrically connected to the corresponding picture element electrode so that the potential of the dummy electrode is the same as that of the corresponding picture element electrode.

14. A liquid crystal display device according to claim 13, wherein the dummy electrode is formed between each picture element and each signal line and address line associated with each picture element.

* * * * *